(12) United States Patent
Pajona et al.

(10) Patent No.: US 11,509,441 B2
(45) Date of Patent: *Nov. 22, 2022

(54) STATE PREDICTION PROCESS AND METHODOLOGY

(71) Applicant: AVX Antenna, Inc., San Diego, CA (US)

(72) Inventors: Olivier Pajona, Antibes (FR); Sebastian Rowson, San Diego, CA (US); Laurent Desclos, San Diego, CA (US)

(73) Assignee: Kyocera AVX Components (San Diego), Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/175,834

(22) Filed: Feb. 15, 2021

(65) Prior Publication Data

US 2021/0167927 A1 Jun. 3, 2021

Related U.S. Application Data

(63) Continuation of application No. 16/530,376, filed on Aug. 2, 2019, now Pat. No. 10,924,247, which is a
(Continued)

(51) Int. Cl.
| | | |
|---|---|---|
| *H04L 5/00* | (2006.01) | |
| *H01Q 3/44* | (2006.01) | |
| *H01Q 19/28* | (2006.01) | |
| *H04B 7/0413* | (2017.01) | |
| *H04B 7/06* | (2006.01) | |

(Continued)

(52) U.S. Cl.
CPC .......... *H04L 5/0057* (2013.01); *H01Q 1/243* (2013.01); *H01Q 3/44* (2013.01); *H01Q 19/28* (2013.01); *H04B 7/0413* (2013.01); *H04B 7/0689* (2013.01); *H04B 17/318* (2015.01); *H04B 7/10* (2013.01)

(58) Field of Classification Search
CPC ... H04L 5/0053; H04L 5/0048; H04L 5/0094; H04L 5/001; H04L 5/0023; H04L 1/0026; H04L 5/0057; H04L 5/0007; H04L 5/0055; H04L 5/0044; H04L 5/0051; H04L 5/0091; H04L 1/0003; H04L 1/0009; H04L 1/0015; H04L 5/005; H04L 5/0092; H04L 1/0675; H04L 5/0035; H04L 1/1822; H04L 25/0204; H04L 27/2647; H04L 27/3863; H04L 25/0228; H04L 5/0078; H04L 5/1469
USPC ........................................................ 455/63.4
See application file for complete search history.

(56) References Cited

U.S. PATENT DOCUMENTS

| | | |
|---|---|---|
| 6,765,536 B2 | 7/2004 | Phillips et al. |
| 6,987,493 B2 | 1/2006 | Chen |

(Continued)

*Primary Examiner* — Ajibola A Akinyemi
(74) *Attorney, Agent, or Firm* — Dority & Manning, P.A.

(57) ABSTRACT

A system and method for optimizing the performance for MIMO are provided, the system including multiple antennas, including at least one modal antenna, wherein each of the at least one modal antenna has multiple modes corresponding to multiple radiation patterns, and a processor coupled to the multiple antennas and configured to select a mode among the multiple modes to optimize signal quality for each time interval based on a CQI by considering envelop correlation effects.

17 Claims, 6 Drawing Sheets

Related U.S. Application Data continuation of application No. 16/180,175, filed on Nov. 5, 2018, now Pat. No. 10,374,779, which is a continuation of application No. 15/209,644, filed on Jul. 13, 2016, now Pat. No. 10,122,516, which is a continuation of application No. 14/077,128, filed on Nov. 11, 2013, now Pat. No. 9,425,497, which is a continuation-in-part of application No. 13/749,627, filed on Jan. 24, 2013, now Pat. No. 9,231,669.

(60) Provisional application No. 61/725,019, filed on Nov. 11, 2012.

(51) Int. Cl.
*H01Q 1/24* (2006.01)
*H04B 17/318* (2015.01)
*H04B 7/10* (2017.01)

(56) References Cited

U.S. PATENT DOCUMENTS

| | | | |
|---|---|---|---|
| 7,068,234 B2 | 6/2006 | Sievenpiper | |
| 7,215,289 B2 | 5/2007 | Harano | |
| 7,830,320 B2 | 11/2010 | Shamblin | |
| 7,911,402 B2 | 3/2011 | Rowson et al. | |
| 8,362,962 B2 | 1/2013 | Rowson et al. | |
| 8,446,318 B2 | 5/2013 | Ali et al. | |
| 8,648,755 B2 | 2/2014 | Rowson et al. | |
| 8,717,241 B2 | 5/2014 | Shamblin et al. | |
| 9,065,496 B2 | 6/2015 | Rowson et al. | |
| 9,231,669 B2 | 1/2016 | Desclos et al. | |
| 9,240,634 B2 | 1/2016 | Rowson et al. | |
| 9,425,497 B2 | 8/2016 | Pajona et al. | |
| 9,439,151 B2 | 9/2016 | Zhu et al. | |
| 9,479,242 B2 | 10/2016 | Desclos et al. | |
| 9,590,703 B2 | 3/2017 | Desclos et al. | |
| 9,755,305 B2 | 9/2017 | Deslos et al. | |
| 9,755,580 B2 | 9/2017 | Desclos et al. | |
| 2008/0037669 A1* | 2/2008 | Pan | H04L 1/0014 375/267 |
| 2008/0204331 A1 | 8/2008 | Shtrom | |
| 2008/0233967 A1 | 9/2008 | Montojo | |
| 2013/0019333 A1 | 5/2013 | Rowson | |
| 2013/0109333 A1* | 5/2013 | Rowson | H04B 7/0825 455/101 |
| 2013/0176964 A1* | 7/2013 | Pan | H04L 25/0224 370/329 |

* cited by examiner

| Use Condition | Antenna | Mode | TRP | TIS | ρ | θ | | Ecc | | | |
|---|---|---|---|---|---|---|---|---|---|---|---|
| 1 | 1 | 1 | trp1,11 | tis1,11 | ρ1,11[1:N] | θ1,11[1:N] | ..... | Ecc^(j)(11|21) | Ecc^(j)(11|22) | .... | Ecc^(j)(14|24) |
| 1 | 1 | 2 | trp1,12 | tis1,12 | ρ1,12[1:N] | θ1,12[1:N] | | | | | |
| 1 | 1 | 3 | trp1,13 | tis1,13 | ρ1,13[1:N] | θ1,13[1:N] | | | | | |
| 1 | 1 | 4 | trp1,14 | tis1,14 | ρ1,14[1:N] | θ1,14[1:N] | | | | | |
| 1 | 2 | 1 | trp1,21 | tis1,21 | ρ1,21[1:N] | θ1,21[1:N] | | | | | |
| 1 | 2 | 2 | trp1,22 | tis1,22 | ρ1,22[1:N] | θ1,22[1:N] | | | | | |
| 1 | 2 | 3 | trp1,23 | tis1,23 | ρ1,23[1:N] | θ1,23[1:N] | | | | | |
| 1 | 2 | 4 | trp1,24 | tis1,24 | ρ1,24[1:N] | θ1,24[1:N] | | | | | |
| 2 | 1 | 1 | trp2,11 | tis2,11 | ρ2,11[1:N] | θ2,11[1:N] | ..... | Ecc^(j)(11|21) | Ecc^(j)(11|22) | .... | Ecc^(j)(14|24) |
| 2 | 1 | 2 | trp2,12 | tis2,12 | ρ2,12[1:N] | θ2,12[1:N] | | | | | |
| 2 | 1 | 3 | trp2,13 | tis2,13 | ρ2,13[1:N] | θ2,13[1:N] | | | | | |
| 2 | 1 | 4 | trp2,14 | tis2,14 | ρ2,14[1:N] | θ2,14[1:N] | | | | | |
| 2 | 2 | 1 | trp2,21 | tis2,21 | ρ2,21[1:N] | θ2,21[1:N] | | | | | |
| 2 | 2 | 2 | trp2,22 | tis2,22 | ρ2,22[1:N] | θ2,22[1:N] | | | | | |
| 2 | 2 | 3 | trp2,23 | tis2,23 | ρ2,23[1:N] | θ2,23[1:N] | | | | | |
| 2 | 2 | 4 | trp2,24 | tis2,24 | ρ2,24[1:N] | θ2,24[1:N] | | | | | |

STATE PREDICTION PROCESS AND METHODOLOGY

CROSS-REFERENCE TO RELATED APPLICATIONS

This application is a continuation of U.S. Ser. No. 16/530,376, filed Aug. 2, 2019, titled "STATE PREDICTION PROCESS AND METHODOLOGY", which is a continuation of U.S. Ser. No. 16/180,175 filed Nov. 5, 2018, titled "STATE PREDICTION PROCESS AND METHODOLOGY" (issued as U.S. Pat. No. 10,374,779 on Aug. 6, 2019), which is a continuation of U.S. Ser. No. 15/209,644, filed Jul. 13, 2016, titled "STATE PREDICTION PROCESS AND METHODOLOGY" (issued as U.S. Pat. No. 10,122,516 on Nov. 6, 2018), which is a continuation of U.S. Ser. No. 14/077,128, filed Nov. 11, 2013, titled "STATE PREDICTION PROCESS AND METHODOLOGY" (issued as U.S. Pat. No. 9,425,497 on Aug. 23, 2016);

said U.S. Ser. No. 14/077,128 is a continuation in part of U.S. Ser. No. 13/749,627, filed Jan. 24, 2013, and titled "MODAL COGNITIVE DIVERSITY FOR MOBILE COMMUNICATION MIMO SYSTEMS" (issued as U.S. Pat. No. 9,231,669 on Jan. 5, 2016); and claims benefit of priority with U.S. Ser. No. 61/725,019, filed Nov. 11, 2012, and titled "STATE PREDICTION PROCESS AND METHODOLOGY";

the contents of each of which are hereby incorporated by reference.

BACKGROUND OF THE INVENTION

As new generations of handsets and other wireless communication devices become smaller and embedded with increased applications, new antenna designs, system configurations and controlling algorithms are required to enable new capabilities and to improve QOS.

In many instances, the line of sight between a transmitter and a receiver involved in the communication becomes blocked or shadowed with obstacles such as walls and other objects. Each signal bounce may introduce phase shills, time delays, attenuations and distortions, which ultimately interfere at the receiving antenna. Destructive interference in the wireless link is problematic and results in degradation of device performance.

A signal quality metric is often used to assess the quality of signals. Examples of such quality metrics include signal-to-noise ratio (SNR), signal to interference-plus-noise ratio (SINR), receive signal strength indicator (RSSI), hit error rate (BER) and other metrics, which are called channel quality indicators (CQI). Multiple Input Multiple Output (MIMO) systems or antenna diversity schemes can be used to improve the quality and reliability of a wireless communication link.

An antenna diversity scheme can mitigate interference from multipath environments by monitoring one or more CQIs. Antenna diversity can be implemented generally in several forms, including spatial diversity, pattern diversity and polarization diversity. Each of these diversity schemes requires one or more processing techniques, such as switching, selecting and combining.

Switching is one of the simple and efficient processing techniques and generally includes receiving a signal from a first antenna until the signal level fades below a threshold, at which point active components such as switches engage the second antenna for communication with the receiver.

Selecting is a processing technique that determines an optimal signal for utilization by the receiver during each predetermined time interval. Both selecting and switching techniques may utilize active components, such as switches, to select the optimal signal based on one or more CQIs. The selecting and switching techniques may be collectively called a switching technique wherein the selection of the signal for utilization is carried out by controlling the switches or other active components coupled to the antennas.

Combining is a processing technique wherein the multiple signals at the receiver are weighted and combined into a signal for communication. The weights are adjusted such that a main lobe of a receiving beam pattern is toward the desired direction and a null of the receiving beam pattern is toward the interference direction. Examples of combining techniques include a minimum mean squared error (MMSE) combining technique, a maximum ratio combining (MRC) technique and an equal gain combining (EGC) technique.

In the diversity scenarios, the different signals received at the different antennas of the receiver are coming from the single transmitting antenna and contain the same message. The selecting or switching schemes may be adapted for Single Input Single Output (SISO) systems while the combining scheme may be adapted for Multiple Input Single Output (MISO) systems.

Different from diversity schemes, a MIMO system can mitigate interference from the multipath environment by using several transmit (Tx) antennas at the same time to transmit different signals, which are not identical but are different variants of the same message, and several receive (Rx) antennas at the same time to receive the different signals. A MIMO system can generally offer significant increase in data throughput without additional bandwidth or increased transmit power by spreading the same total transmit power over the antennas so as to achieve an array gain. MIMO protocols constitute a part of wireless communication standards such as IEEE 802.11n (WiFi), 4G, Long Term Evolution (LTE), WiMAX and HSPA+.

However, in a MIMO system, each radio link between one of the Rx antennas and one of the TX antennas may still face destructive interferences due to phase shifts, time delays, attenuations, distortions and various other electromagnetic effects as explained earlier. It is possible to improve the overall performance of the MIMO system by improving the quality and reliability of each link by using a selecting or switching diversity scheme, for example.

In Rx diversity for a conventional wireless mobile device, one or more diversity antennas are added in the device to support the diversity scheme. A MIMO system already uses multiple (N) antennas; thus, if each of the Rx antennas in the MIMO system needs one diversity antenna, the system would end up containing 2×N Rx antennas. In such a configuration with multiple antennas, size constraints may become significant, and coupling among the antennas as well as between the antennas and nearby electronics of a communication device may significantly deteriorate transmission and reception qualities. Additionally, efficiency may deteriorate in many instances where multiple paths are energized and power consumption increases. Implementing two, three or more diversity antennas may provide system flexibility, but the volume and area requirements become increasingly severe as additional antennas, associated components and transmission lines are needed. As such, mixing diversity and MIMO techniques has gained limited popularity thus far.

DETAILED DESCRIPTION

Active antennas which could replace the role of several passive antennas in pattern or polarization diversity schemes can be used to reduce the number of antennas. For example, a modal antenna, also referred to as a null-steering antenna, can generate multiple modes corresponding to multiple radiation patterns, equivalent to having a set of antennas with the same feed. By using the modal antenna capable of generating different radiation patterns, it is possible to exploit a priori knowledge of antenna nulls and lobes in the different modes for steering the beam to have nulls in dominant interference directions while keeping gain in desired directions. Accordingly, implementation of a modal antenna may allow for pattern and/or polarization diversity with one antenna, thereby requiring less volume and area than using multiple antennas for diversity. Examples of structures and implementations of the modal antennas are provided in U.S. Pat. No. 7,911,402, entitled "ANTENNA AND METHOD FOR STEERING ANTENNA BEAM DIRECTION." issued on Mar. 22, 2011; the contents of the of which are incorporated herein by reference and are summarized as follows.

Figure 1:
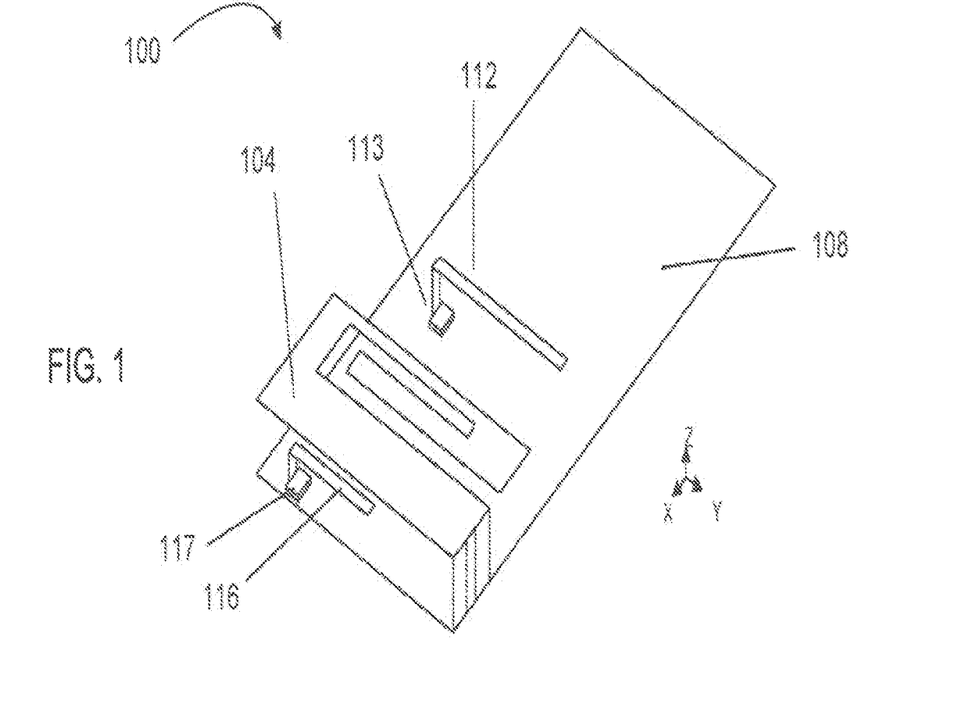
FIG. 1 illustrates an example of a modal antenna.
Figure 2A:
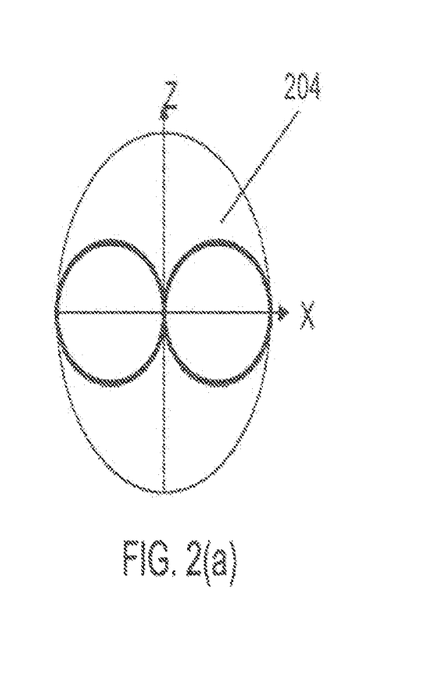
FIG. 2(a) illustrates a radiation pattern associated with the modal antenna of FIG. 1 in the first state.
Figure 2B:
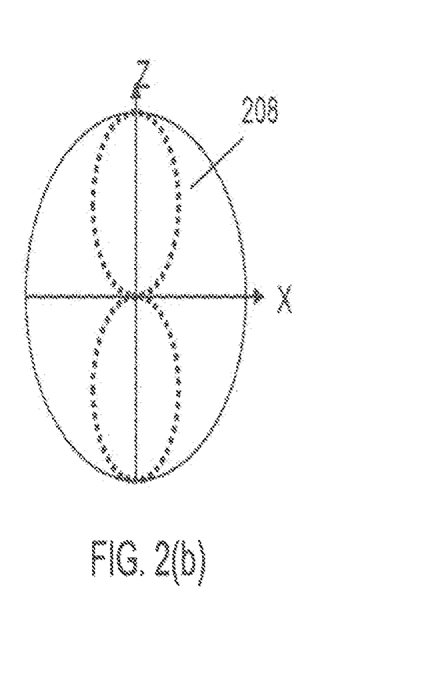
FIG. 2(b) illustrates a radiation pattern associated with the modal antenna of FIG. 1 in the second state.

FIG. 1 illustrates an example of a modal antenna 100, which includes an Isolated Magnetic Dipole™ (IMD) element 104 placed on a ground plane 108, a first parasitic element 112 coupled to an first active element 113, and a second parasitic element 116 coupled to a second active element 117. The active elements 113 and 117 may include switches that either electrically connect (short) or disconnect (open) the parasitic elements 112 and 116 to the ground plane 108. This structure allows for two different modes of operation with a common frequency corresponding to a first state where the parasitic elements 112 and 116 are shorted to the ground and a second state where the parasitic elements 112 and 116 are open. FIG. 2(a) illustrates a radiation pattern 204 associated with the antenna 100 in the first state; and FIG. 2(b) illustrates a radiation pattern 208 in the second state, which shows a ninety-degree shift in direction as compared to the radiation pattern 204. Thus, by controlling the active elements 113 and 117 of the modal antenna 100, the operation of two modes can be obtained at the same frequency. The control scheme can be extended for three or more multi-mode operations by incorporating, for example, tunable elements in the active elements for variable control and additional active elements for matching. Examples of these active elements include switches, tunable capacitors, tunable phase shifters, diodes, micro-electro-mechanical system (MEMS) switches. MEMS tunable capacitors, and transistors including a metal oxide semiconductor field effect transistor (MOSFET), a metal semiconductor field effect transistor (MESFET), a pseudomorphic high electron mobility transistor (pHEMT), a heterojunction bipolar transistor (HBT) or of other suitable technologies.

Upon using a modal antenna, the procedure to select an optimal mode may be required before receiving the data. The procedure needs to be carried out dynamically since the use conditions, movement of the handset, incoming signal properties, base station conditions and various other conditions and surroundings vary with time. A method to dynamically find an optimal mode among multiple modes of a modal antenna for diversity has been described in the U.S. patent application Ser. No. 13/749,627, entitled "MODAL COGNITIVE DIVERSITY FOR MOBILE COMMUNICATION," filed on Jan. 24, 2013. The method is thus termed "modal cognitive diversity (MCD)" therein. The contents of the '627 patent application are incorporated herein by reference and are summarized as follows.

A linear predictor based on a normalized-least-mean-square (NLMS) adaptive filter can be used to derive future CQI estimates in the MCD algorithm. In this algorithm, the vector W(n) represents the filter tap weight vector (coefficients of filter) and the vector X(n) represents the filter input vector (CQI values) at time n as follows:

$$W(n)=[W_1(n),W_2(n),\ldots,W_M(n)]^T$$

$$X(n)=[CQI(n-1),CQI(n-2),\ldots,CQI(n-M)]^T.$$

Here T represents the transpose operator, and M represents the filter length. The NLMS adaptation equation gives the coefficients of filter at time n+1 as follows:

$$W(n+1) = W(n) + \mu \frac{X(n)e(n)}{X(n) \cdot X^H(n)}. \quad \text{Eq. (1)}$$

Here $\mu$ is the step size parameter, e(n) is the CQI prediction error, and H represents the Hermitian transpose. The future value of CQI, $\overline{CQI}$ (n+1), can be predicted at time n as:

$$\overline{CQI}(n+1)=X(n+1),W^{11}(n+1). \quad \text{Eq. (2)}$$

where $$X(n+1)=[CQI(n),CQI(n-1),\ldots,CQI(n+l-M)]^T. \quad \text{Eq. (3)}$$

Thus, the above equation Eq. (2) for $\overline{CQI}$ (n+1) indicates that the CQI value at time n+1 can be predicted based on the coefficients of filter W(n) that depends on the quantities during the filter length M up until time n as shown in Eq. (1) and the CQI values during the filter length M up until time n as shown in Eq. (3).

Pilot signals can be used to measure and calculate CQIs in the CQI prediction algorithm. In cellular and personal communication services (PCS) systems based on code division multiple access (CDMA), for example, a pilot signal is used for synchronization, coherent detection, soft handoff, maintaining orthogonality between base stations and so on. A pilot signal is a carrier modulated by a high chip rate pulse-shaped pseudo noise (PN) sequence and is transmitted on the forward link (from a base station to a mobile unit). All mobile units are designed to have the prior knowledge of the periodic PN sequence.

In the above MCD scheme, the CQI prediction algorithm is carried out for each mode of one modal antenna at each time step to determine the expected (predicted) CQI for each mode j, $\overline{CQI}j(n+1)$. Specifically, the filter input vector X(n) contains CQI values which are either previous measurements CQIi(n−k) (when the mode j corresponding to the filter j was selected), or previous predicted CQI values for this mode $\overline{CQI}j(n-k)$ (when the mode j corresponding to the filter j is currently selected). It can also contain a combination of CQIi(n−k) and $\overline{CQI}j(n-k)$ during transition phases which occur when the decision is made to switch from one mode to another mode.

In the present MCD algorithm, at a given time step n, the instantaneous CQI for the currently selected i-th mode, CQIi(n), is measured and the predicted CQI for the i-th mode $\overline{CQI}i(n+1)$ is computed and compared to the predicted CQI for the j-th mode, $\overline{CQI}j(n+1)$. The mode switches to the j-th mode if:

$$\overline{CQI}_i(n+1) < \overline{CQI}_j(n+1) - \Delta. \qquad \text{Eq. (4)}$$

where Δ is a predetermined threshold and i≠j. The threshold may be predetermined such that the switch from one mode to another gives a meaningful, good enough CQI improvement. If the expected CQI improvement is less than the threshold, or the other modes provide the predicted CQI values lower than the instantaneous CQI of the i-th mode, the mode stays the same.

The above algorithm can be extended so that the filter input vector X(n) gets conditioned before entering the filtering process, through additional steps, to modify its range or scale in order to optimize the predictive filtering process. Typically the DC or the magnitude offset contained in the original signal can be subtracted from the signal before entering the filtering process. These additional steps may be referred to as a "pre-filtering process." The DC or the magnitude offset may be added to the filter's output signal during a post-processing process.

The MCD algorithm described above is suited for the case of having a single Tx antenna (SISO or MISO). In a MIMO system that has a complex multi-path environment, the coupling, polarization differences, radiation pattern differences, efficiency differences and other differences or various antenna characteristics among antennas impact the overall performance of the MIMO system. One commonly used metric to quantify the impact of one antenna over another is the envelope correlation, which is often parameterized using envelop correlation coefficients (Ecc). Supposing a modal antenna is used as one of the MIMO antennas, the selection of the optimum mode among the multiple modes of the modal antenna is not straightforward due to the envelope correlation effects. Thus, the above MCD algorithm needs to be re-configured to account for the envelop correlation effects in the MIMO system.

Figure 3:
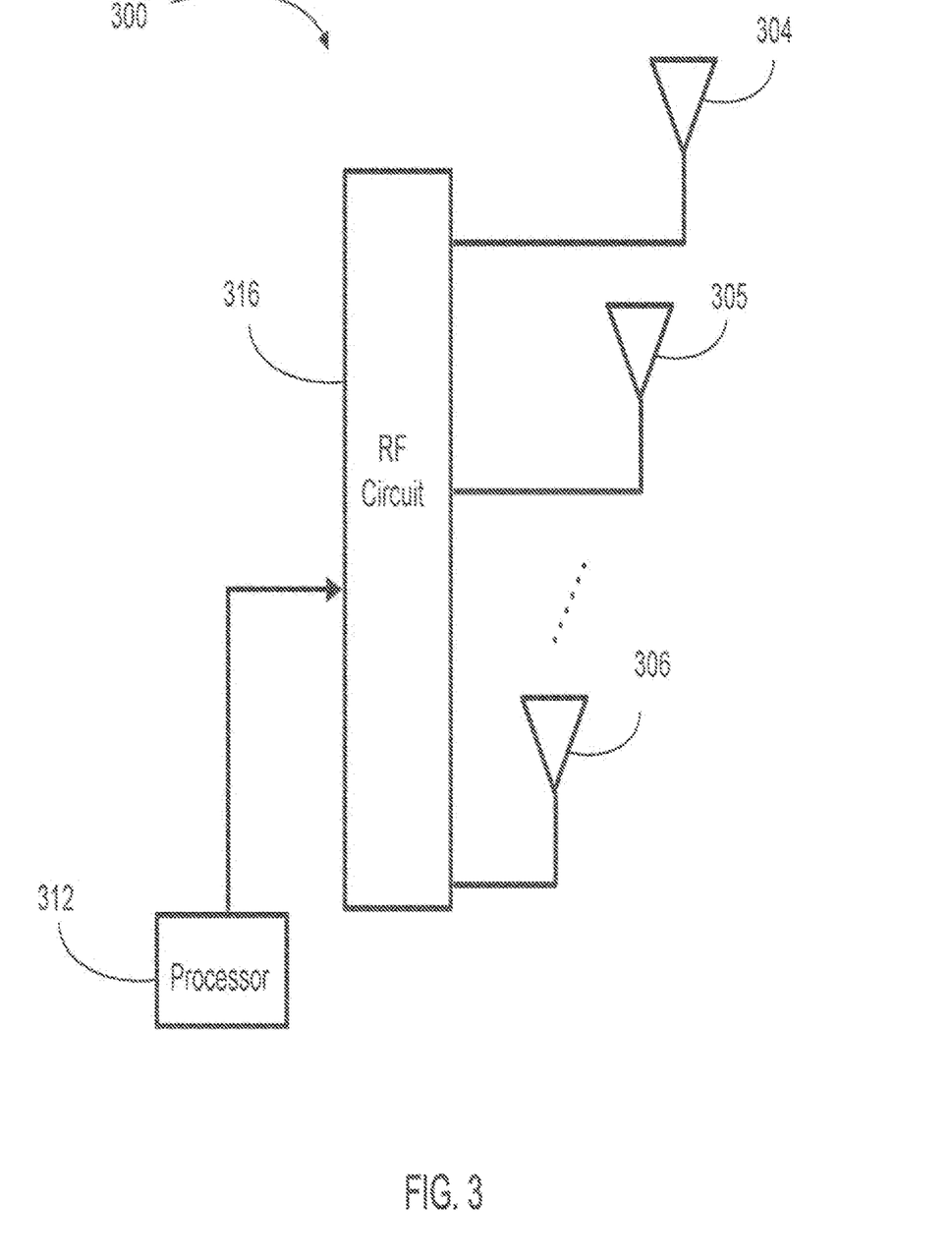
FIG. 3 illustrates an example of an Rx section of a MIMO system, including multiple Rx antennas, a processor and a radio frequency (RF) circuit, wherein at least one of the multiple Rx antennas is a modal antenna.

FIG. 3 illustrates an example of an Rx section 300 of a MIMO system. This Rx section 300 includes multiple Rx antennas 304, 305 . . . and 306, a processor 312 and a radio frequency (RF) circuit 316, wherein at least one of the multiple Rx antennas 304, 305 . . . and 306 is a modal antenna. The others can be conventional non-modal antennas, or all the multiple antennas 304, 305 . . . and 306 can be modal antennas. The multiple antennas 304, 305 . . . and 306 are coupled to the processor 312 through the RF circuit 316. The RF circuit includes various modules and components for processing signals, such as filters, switches, low noise amplifiers, matching networks and so on. The processor 312 may be included in a baseband, a CPU or an application CPU, or associated with the RF circuit or the antennas. The processor 312 may be configured to store data, specifications and other prerequisites as well as to perform algorithms to control the antennas and other components and modules. In the MIMO system, each of the Rx antennas 304, 305 . . . and 306 is configured to receive signals from multiple Tx antennas; thus, the interferences among different signal paths and associated correlation effects need to be taken into consideration.

Figure 4:
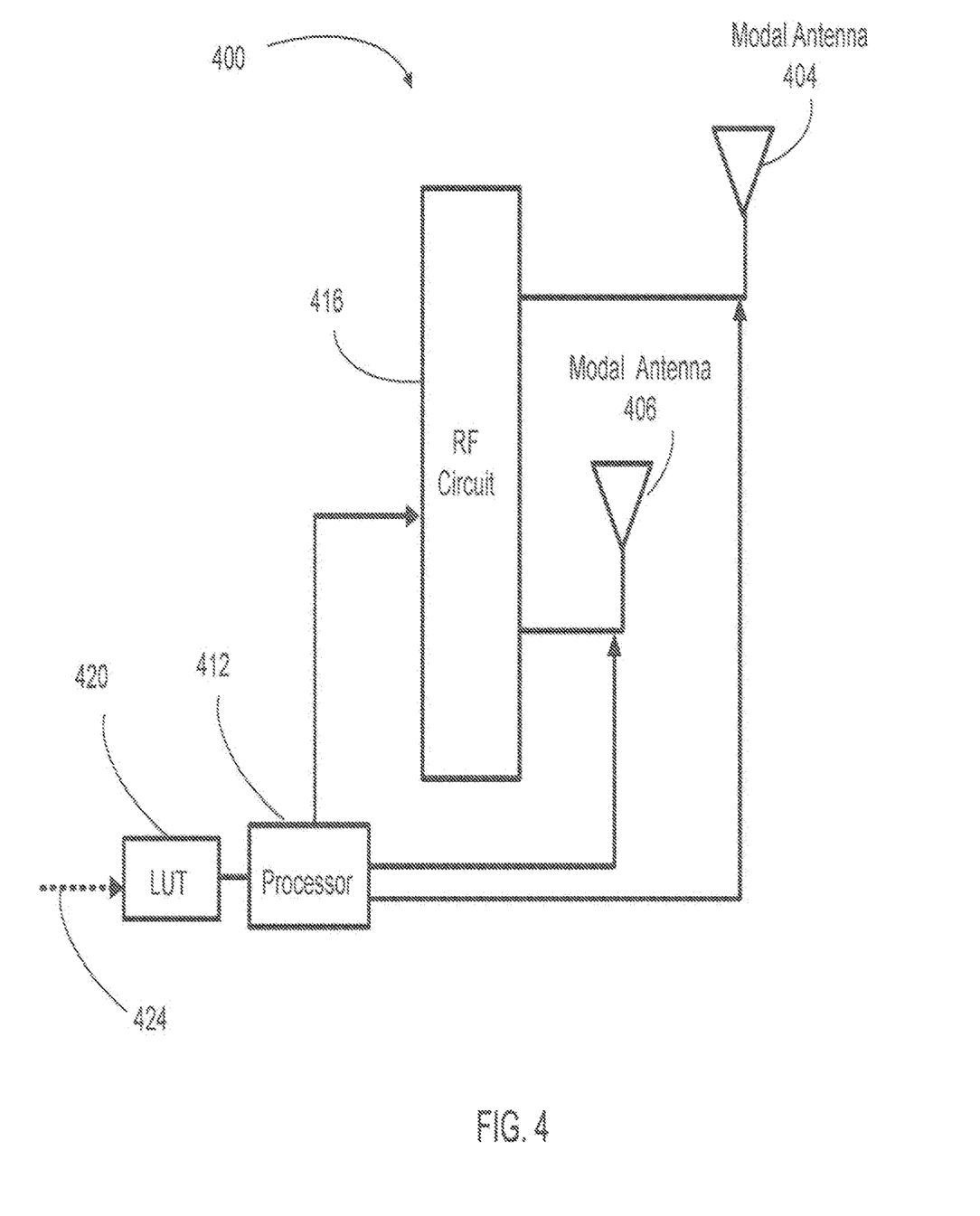
FIG. 4 illustrates an example of an Rx section of a MIMO system, in which two modal antennas, a processor and a RF circuit are included.

FIG. 4 illustrates one specific example of an Rx section 400 of a MIMO system, in which two modal antennas 404 and 406, a processor 412, and a radio frequency (RF) circuit 416 are included. A look-up table (LUT) 420 may be added to provide input information for the processor 412. The LUT 420 may contain measured and/or calculated data and be stored in a memory in the processor 412 or in a different location coupled to the processor 412. The modal antennas 404 and 406 can be controlled by the processor 412. The processor 412 may be configured to store data, specifications and other prerequisites as well as to perform algorithms to control the antennas and other components and modules. For example, the processor 412 may control the on/off of the active elements of the modal antenna to configure the parasitic elements to generate multiple modes corresponding to multiple radiation patterns. Such a modal antenna tuning means may be included in the processor 412 as in FIG. 4, coupled with the modal antenna 406 to form a "plug-and-play" modal antenna system, or separated as a modal antenna tuning module.

Figure 5:
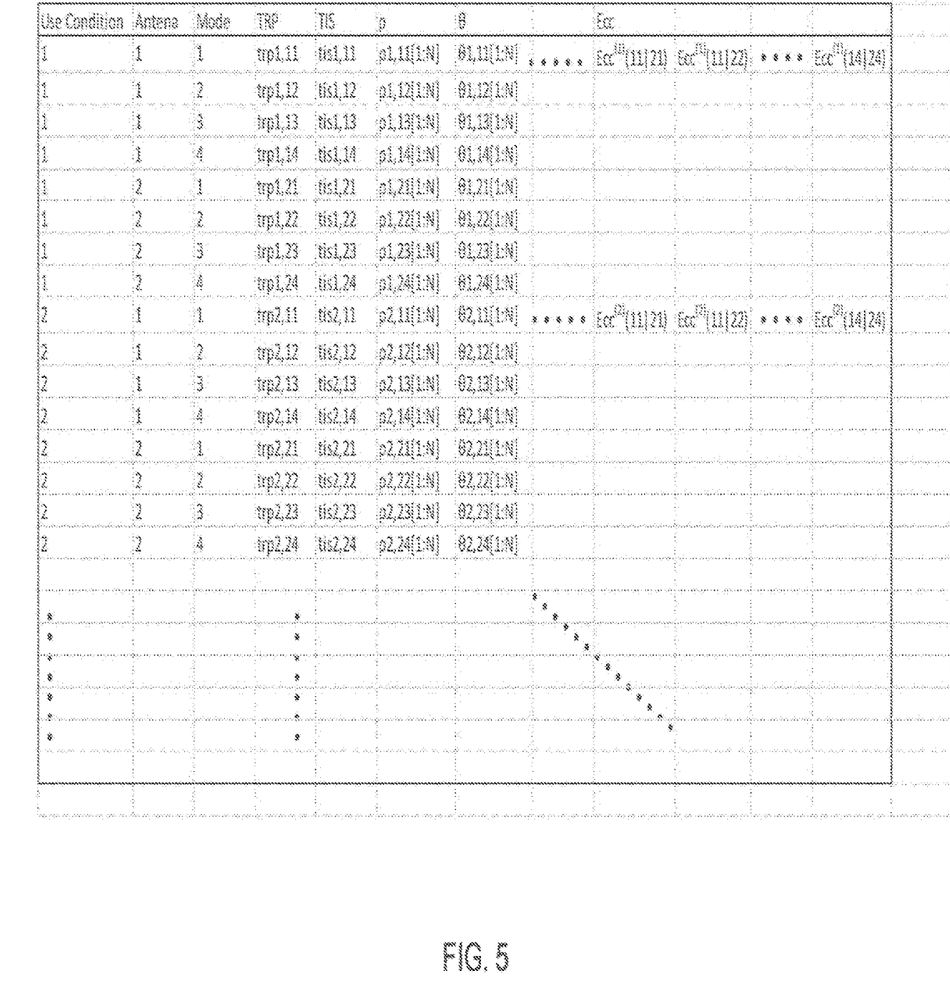
FIG. 5 illustrates an example of a look-up table (LUT).

The LUT 420 may include characterization data of the modal antennas 406 and 406, such as total radiated power (TRP), total isotropic sensitivity (TIS), radiation patterns and so on, which can be measured in advance for various use conditions. The radiation pattern may be stored with the (ρ, 0) coordinate having N points (300-500 points, for example). The use conditions may include positioning of a head and/or a hand of a user including the possible distances and angles with respect to the device, movement of the device, incoming signal properties, base station conditions and various other performance-affecting conditions. FIG. 5 illustrates an example of the LUT 420 for the case in which each of the modal antennas 404 and 406 has four modes. Under each use condition, all the modes of the two antennas are listed along with the corresponding characterization data. In addition, this LUT 420 lists envelop correlation coefficients Ecc between all the modes of the two antennas. For example, under the condition 1, the corresponding Ecc values, measured or calculated, are listed for the 16 (4×4) pairs. i.e., mode 1 of antenna 1 and mode 1 of antenna 2, mode 1 of antenna 1 and mode 2 of antenna 2, . . . and mode 4 of antenna 1 and mode 4 of antenna 2. Similarly, under each of the other conditions, the corresponding Ecc values, measured or calculated, are listed for the 16 (4×4) pairs, i.e., mode 1 of antenna 1 and mode 1 of antenna 2, mode 1 of antenna 1 and mode 2 of antenna 2, . . . and mode 4 of antenna 1 and mode 4 or antenna 2.

Alternatively or additionally, the Ecc values in the LUT can be dynamically adjusted over time or during some specific training phases in the adaptive filter method to take into account real-time use conditions based on CQI measurements.

During operation, the use condition may be detected by one or more sensors such as a proximity sensor, a motion sensor, a light sensor, a pressure sensor or other types of sensors. Information on the use condition may be inputted to the LUT 420 as indicated by dashed line 424 in FIG. 4. Based on the information and the corresponding characterization data of each mode of the modal antenna, two or more modes that are likely to provide optimal signal properties can be chosen under the use condition. The use condition varies with time, and thus the processor 412 may be configured to perform the mode-selection procedure dynamically based on a predetermined time interval and/or a change threshold. The role of LUT for the mode-selection procedure for a single modal antenna is described in the aforementioned U.S. patent application Ser. No. 13/749,627.

As mentioned above, the interference effects arising from the multi-path environment are substantial for a MIMO system, influencing the quality and reliability of the signals as represented by the CQI. The Ecc is a metric indicating possible negative impact that one antenna would have on another antenna. The Ecc can be measured and/or calculated for various use conditions prior to actual operations, and pre-stored in a memory or a LUT as in FIG. 5. The method to dynamically find an optimal mode among multiple modes of a modal antenna can be modified for a MIMO system, where multiple antennas electromagnetically interfere among each other as indicated by the Ecc values. Described below is the case of a 2×2 MIMO system, the Rx section of which is illustrated in FIG. 4 as an example. The procedure for this case thus involves dynamically obtaining a pair of modes, i.e., one mode of one Rx modal antenna and one mode of the other Rx modal antenna, which provides the optimum performance of the system.

Such a MIMO MCD algorithm can be easily extended for the cases of three or more Rx antennas in the system, where at least one antenna is a modal antenna.

Additionally, the similar algorithm can be used for Tx antennas of a MIMO system by utilizing feedback signals from the base station, for example.

Figure 6A:
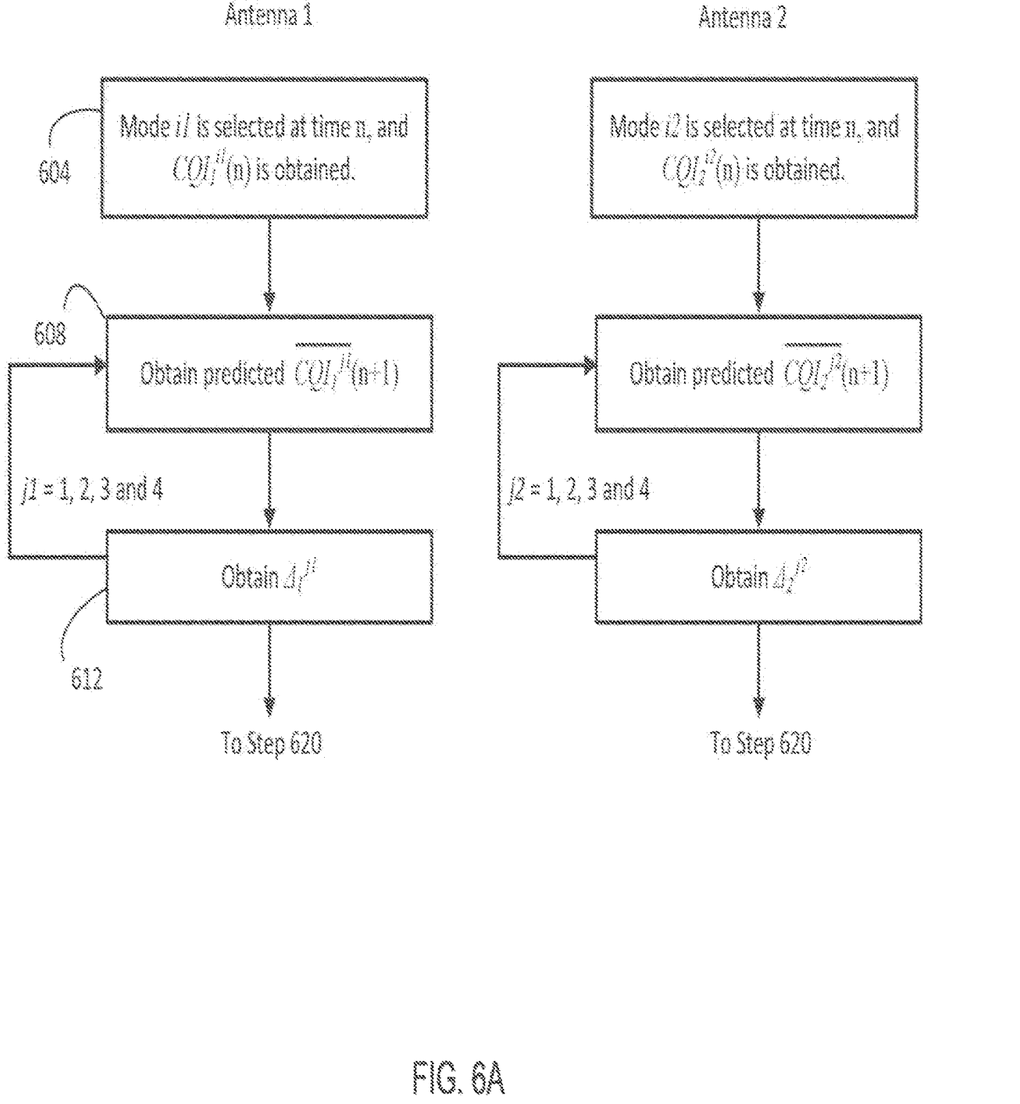
FIG. 6A illustrates independent processes for Antenna 1 and Antenna 2 to obtain an expected improvement in CQI.
Figure 6B:
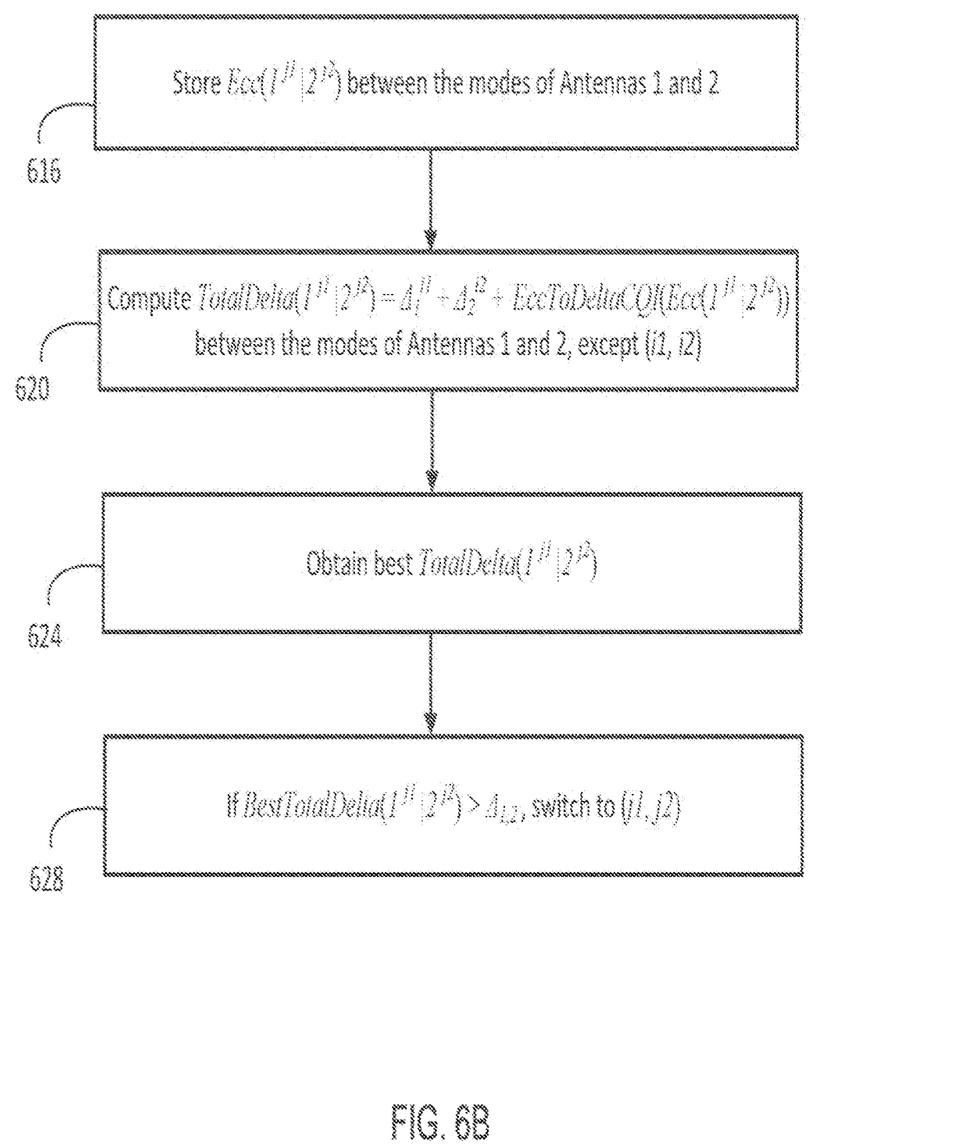
FIG. 6B illustrates a process to obtain the optimum pair of modes.

FIGS. 6A and 6B illustrate a process to obtain a pair of modes, i.e., one mode of Antenna 1 and one mode of Antenna 2, which provides the optimum performance of the system during each time interval. These antennas are configured to be Rx modal antennas in this example of FIGS. 4 and 5. FIG. 6A illustrates independent processes for Antenna 1 and Antenna 2 to obtain an expected improvement in CQI when the currently selected mode is switched to a different mode of each modal antenna. FIG. 6B illustrates a process to obtain the optimum pair of modes based on envelope correlation effects and the individual CQI improvements expected when the antennas are operating independently as in FIG. 6A.

In FIG. 6A, in the step 604, the mode i1 of Antenna 1 is selected at time n according to the MCD algorithm including Eqs. (1)-(4) above. Correspondingly, the instantaneous CQI for the currently selected i1-th mode of Antenna 1, CQI i1(n), is obtained by measurement for time n. In the step 608, the predicted CQI at time (n+1) for the j1-th mode of Antenna 1. $\overline{CQI}_1$ j1 (n+1), is obtained using Eq. (2). The expected CQI improvement by switching from mode i1 to mode j1, is defined as follows:

$$\Delta_1^{j1} = \overline{CQI}_1^{j1}(n+1) - \overline{CQI}_1^{i1}(n+1). \quad \text{Eq. (5)}$$

where j1=1, 2, 3 and 4 in the present example. The value of Δ1 j1 can be positive, negative or zero; thus, the expected CQI improvement Δ1 j1 can actually be degradation. The same process is taken independently for Antenna 2 as shown on the right in FIG. 6A to obtain the expected CQI improvement Δ2 j2 by switching from mode i2 to mode j2, where j2=1, 2, 3 and 4 in the present example.

As mentioned earlier, the Ecc values between the modes of Antennas 1 and 2 can be measured and/or calculated in advance, and stored in a LUT as in the step 616 in FIG. 6B. An example of the LUT is shown in FIG. 5. The Ecc between the j1-th mode of Antenna 1 and the j2-th mode of Antenna 2 are denoted as Ecc(1j1|2j2) where j1=1, 2, 3 and 4 and j2=1, 2, 3 and 4 in the present example. After the independent processes to obtain the Δ values in FIG. 6A, the process proceeds to the step 620 in FIG. 6B, where the total CQI improvement expected by switching from the selected pair of modes (i1, i2) to each of the other 15 pairs (4×4−1) is computed in the step 620. The total CQI improvement of the system for the case of having the pair of modes (j1, j2) as a newly selected pair is expresses as follows:

$$\text{TotalDelta}(1^{j1}|2^{j2}) = \Delta_1^{j1} + \Delta_2^{j2} + \text{EccToDeltaCQI}(\text{Ecc}(1^{j1}|2^{j2})), \quad \text{Eq. (6)}$$

where EccToDeltaCQI((Ecc(1j1|2j2)) represents the contribution arising from the Ecc between the pair of modes (j1, j2), which is converted in terms of a CQI gain. These EccToDeltaCQI values can be calculated in advance using the Ecc data and pre-stored in the LUT. Thus, TotalDelta (1j1|2j2) expressed as in Eq. (6) is a combination of the individual CQI improvements expected when the antennas are independently operating plus the CQI contribution arising from the antenna correlation effects. The above CQI contributions or improvements can actually be degradation, since the values may be positive, negative or zero, upon changing the selected pair of modes (i1, i2) to a different pair of modes (j1, j2). Here, j1=1, 2, 3 and 4 and j2=1, 2, 3 and 4, except the pair of (i1, i2), in the present example.

In the step 624 of FIG. 6B, the best or optimum TotalDelta (1j1|2j2) value is obtained by iteratively comparing the values, for example, and is labeled as BestTotalDelta (1j1|2j2). In the step 628, the obtained BestTotalDelta (1j1|2j2) is compared to a predetermined threshold Δ1,2, and the decision to switch to a predicted optimum configuration is made as:

$$\text{If BestTotalDelta}(1^{j1}|2^{j2}) > \Delta_{1,2}, \text{switch to (j1,j2)}. \quad \text{Eq. (7)}$$

Otherwise, stay with the previously selected pair of modes (i1, i2).

The threshold Δ1,2 may be dynamically adjusted to optimize the process depending on information from a CPU, ASICs, sensors or other condition- or environment-detecting means in the system. The information may include a time duration since the last measurement was taken, positioning of the device, etc. The threshold may be predetermined such that the switch from one pair of modes to another gives a meaningful, good enough CQI improvement. The above process is repeated for predetermined time intervals by taking the use conditions into account to select a pair of modes that gives the optimum performance during each time interval.

The MIMO MCD method using the above example of a 2×2 MIMO system can easily be extended by those skilled in the art for the cases of an N×N MIMO system, where N can be three or more, and where at least one Rx antenna is a modal antenna having 2 or more modes. A conventional passive antenna generally has only one mode; thus, the above algorithm as well as the Ecc measurements/calculations can accommodate such a conventional antenna by simply setting the mode j to be 1. Additionally, the similar algorithm can be used for Tx antennas of a MIMO system by utilizing feedback signals from the base station, for example.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed is:

1. A method for operating a multiple input multiple output communication system comprising a first modal antenna and a second modal antenna, the first modal antenna and the second modal antenna each configurable in a plurality of modes, each of the plurality of modes having a distinct radiation pattern, the method comprising:
    configuring, by one or more processors, the first modal antenna and the second modal antenna in one of the plurality of modes;
    determining, by the one or more processors, a channel quality indicator improvement associated with reconfiguring the first modal antenna and the second modal antenna in a different mode of the plurality of modes;
    determining, by the one or more processors, whether to reconfigure the first modal antenna and the second modal antenna in the different mode based, at least in part, on the channel quality indicator improvement; and
    responsive to determining to reconfigure the first modal antenna in the different mode and the second modal antenna in the different mode, providing, by the one or more processors, one or more control signals associated with reconfiguring the first modal antenna in the different mode and the second modal antenna in the different mode.

2. The method of claim 1, wherein determining a channel quality indicator improvement comprises:
    determining, by the one or more processors, a first channel quality indicator improvement associated with reconfiguring the first modal antenna in the different mode of the plurality of modes; and
    determining, by the one or more processors, a second channel quality indicator improvement associated with reconfiguring the second modal antenna in the different mode of the plurality of modes.

3. The method of claim 2, wherein:
    the different mode for the first modal antenna comprises a first mode of the plurality of modes; and
    the different mode for the second modal antenna comprises a second mode of the plurality of modes.

4. The method of claim 2, wherein:
    the different mode for the first modal antenna comprises a first mode of the plurality of modes; and
    the different mode for the second modal antenna comprises the first mode of the plurality of modes.

5. The method of claim 2, wherein determining whether to reconfigure the first modal antenna and the second modal antenna in the different mode comprises:
    obtaining, by the one or more processors, data indicative of an envelope correlation coefficient between the different mode for the first modal antenna and the different mode for the second modal antenna; and
    determining, by the one or more processors, whether to reconfigure the first modal antenna and the second modal antenna in the different mode based, at least in part, on the first channel quality indicator improvement, the second channel quality indicator improvement, and the envelope correlation coefficient.

6. The method of claim 5, wherein determining, whether to reconfigure the first modal antenna and the second modal antenna in the different mode based, at least in part on the first channel quality indicator improvement, the second channel quality indicator improvement, and the envelope correlation coefficient comprises:
    adding, by the one or more processors, the first channel quality indicator improvement, the second channel quality indicator improvement and the envelope correlation coefficient together to obtain a total channel quality indicator improvement; and
    comparing, by the one or more processors, the total channel quality indicator improvement to a threshold value to determine whether to reconfigure the first modal antenna ad the second modal antenna in the different mode.

7. The method of claim 6, wherein providing the one or more control signals associated with reconfiguring the first modal antenna and the second modal antenna in the different mode comprises:
    responsive to determining the total channel quality indicator improvement is greater than the threshold value, providing, by the one or more processors, the one or more control signals associated with reconfiguring the first modal antenna and the second modal antenna in the different mode.

8. The method of claim 1, wherein the first modal antenna and the second modal antenna each comprise a receive (Rx) modal antenna.

9. The method of claim 1, wherein the first modal antenna and the second modal antenna each comprise a transmit (Tx) modal antenna.

10. The method of claim 1, wherein configuring the first modal antenna and the second modal antenna in one of the plurality of modes comprises:
    configuring, by the one or more processors, the first modal antenna in a first mode of the plurality of modes; and
    configuring, by the one or more processors, the second modal antenna in a second mode of the plurality of modes.

11. The method of claim 1, wherein configuring the first modal antenna and the second modal antenna in one of the plurality of modes comprises:
    configuring, by the one or more processors, the first modal antenna and the second modal antenna in a first mode of the plurality of modes.

12. A communication system comprising:
    a plurality of modal antennas, each of the plurality of modal antennas operable in a plurality of modes, each of the plurality of modes associated with a distinct radiation pattern; and
    one or more processors configured to:
        configure a first modal antenna of the plurality of modal antennas in one of the plurality of modes and a second modal antenna of the plurality of modal antennas in one of the plurality of modes;
        determine a channel quality indicator improvement associated with reconfiguring the first modal antenna and the second modal antenna in a different mode of the plurality of modes;
        determine whether to reconfigure the first modal antenna and the second modal antenna in the different mode based, at least in part, on the channel quality indicator improvement; and
        in response to determining to reconfigure the first modal antenna and the second modal antenna in the different mode, provide one or more control signals associated with reconfiguring the first modal antenna in the different mode and the second modal antenna in the different mode.

13. The communication system of claim 12, wherein the channel quality indicator improvement comprises:
a first channel quality indicator improvement associated with reconfiguring the first modal antenna in the different mode; and
a second channel quality indicator improvement associated with reconfiguring the second modal antenna in the different mode.

14. The communication system of claim 13, wherein:
the different mode for the first modal antenna comprises a first mode of the plurality of modes; and
the different mode for the second modal antenna comprises a second mode of the plurality of modes.

15. The communication system of claim 13, wherein the one or more processors are further configured to:
obtain data indicative of an envelope correlation coefficient between the different mode for the first modal antenna and the different mode for the second modal antenna; and
determine whether to reconfigure the first modal antenna and the second modal antenna based, at least in part, on the first channel quality indicator improvement, the second channel quality indicator improvement, and the envelope correlation coefficient.

16. The communication system of claim 12, wherein each of the plurality of modal antennas comprises a receive (Rx) modal antenna.

17. The communication system of claim 12, wherein each of the plurality of modal antennas comprises a transmit (Tx) modal antenna.

* * * * *